United States Patent
Yashiki et al.

(10) Patent No.: US 7,166,367 B2
(45) Date of Patent: Jan. 23, 2007

(54) TITANIUM ALLOY HAVING EXCELLENT HIGH-TEMPERATURE OXIDATION AND CORROSION RESISTANCE

(75) Inventors: Takashi Yashiki, Osaka (JP); Kenji Yamamoto, Kobe (JP); Wataru Urushihara, Kobe (JP)

(73) Assignee: Kobe Steel, Ltd., Kobe (JP)

( * ) Notice: Subject to any disclaimer, the term of this patent is extended or adjusted under 35 U.S.C. 154(b) by 20 days.

(21) Appl. No.: 11/067,763

(22) Filed: Mar. 1, 2005

(65) Prior Publication Data

US 2005/0202271 A1   Sep. 15, 2005

(30) Foreign Application Priority Data

Mar. 12, 2004   (JP) .............................. 2004-071275

(51) Int. Cl.
F01N 7/16      (2006.01)
B32B 15/01     (2006.01)
C22C 14/00     (2006.01)

(52) U.S. Cl. ...................... 428/660; 428/651; 420/418; 181/244

(58) Field of Classification Search ...................... None
See application file for complete search history.

(56) References Cited

U.S. PATENT DOCUMENTS

| | | | |
|---|---|---|---|
| 2,785,451 A | | 3/1957 | Hanink |
| 2,893,864 A | * | 7/1959 | Harris et al. ................. 420/419 |
| 2,899,303 A | | 8/1959 | Busch et al. |
| 5,474,282 A | * | 12/1995 | Eckert .......................... 266/280 |
| 6,531,091 B1 | | 3/2003 | Miyamoto et al. |
| 2002/0000268 A1 | | 1/2002 | Miyamoto et al. |
| 2004/0069838 A1 | * | 4/2004 | Sibum ...................... 228/235.2 |
| 2004/0086730 A1 | * | 5/2004 | Shipton et al. ............. 428/469 |
| 2004/0094241 A1 | * | 5/2004 | Kosaka et al. ............... 148/421 |
| 2004/0265619 A1 | * | 12/2004 | Yamamoto et al. ......... 428/651 |

FOREIGN PATENT DOCUMENTS

| | | |
|---|---|---|
| DE | 37 34056 A1 | 4/1988 |
| GB | 850278 | 10/1960 |
| GB | 879212 | 10/1961 |
| JP | 36-15004 | 9/1961 |
| JP | 43-20900 | 9/1968 |
| JP | 62-197611 | 9/1987 |
| JP | 4-308051 | 10/1992 |
| JP | 08-041565 | * 2/1996 |
| JP | 11-036029 | * 2/1999 |
| JP | 2003-55725 | 2/2003 |
| WO | WO 02/058923 A2 | 8/2002 |

OTHER PUBLICATIONS

Derwent Abstract for Ru 1593259 C, Nov. 15, 1994, 2 pages.*
Peter Spiekermann, "Legierungen-ein besonderes patentrechtliches Problem?", Mitteilungen der deutschen Patentanwaelle, XP-000961882, 1993, pp. 178-190.

* cited by examiner

*Primary Examiner*—John J. Zimmerman
(74) *Attorney, Agent, or Firm*—Oblon, Spivak, McClelland, Maier & Neustadt, P.C.

(57) ABSTRACT

A titanium alloy having excellent high-temperature oxidation and corrosion resistance is disclosed which comprises, by mass, Al: 0.30–1.50%, and Si: 0.10–1.0%. Preferably, amass ratio Si/Al is not less than 1/3. More preferably, the titanium alloy further comprises Nb: 0.1–0.5% by mass. The titanium alloy is useful as an exhaust system material for a vehicle or a motorbike, which enhances corrosion and high-temperature oxidation resistance, while utilizing inherent lightness and corrosion resistance of an original titanium alloy without impairing economy and workability.

7 Claims, 8 Drawing Sheets

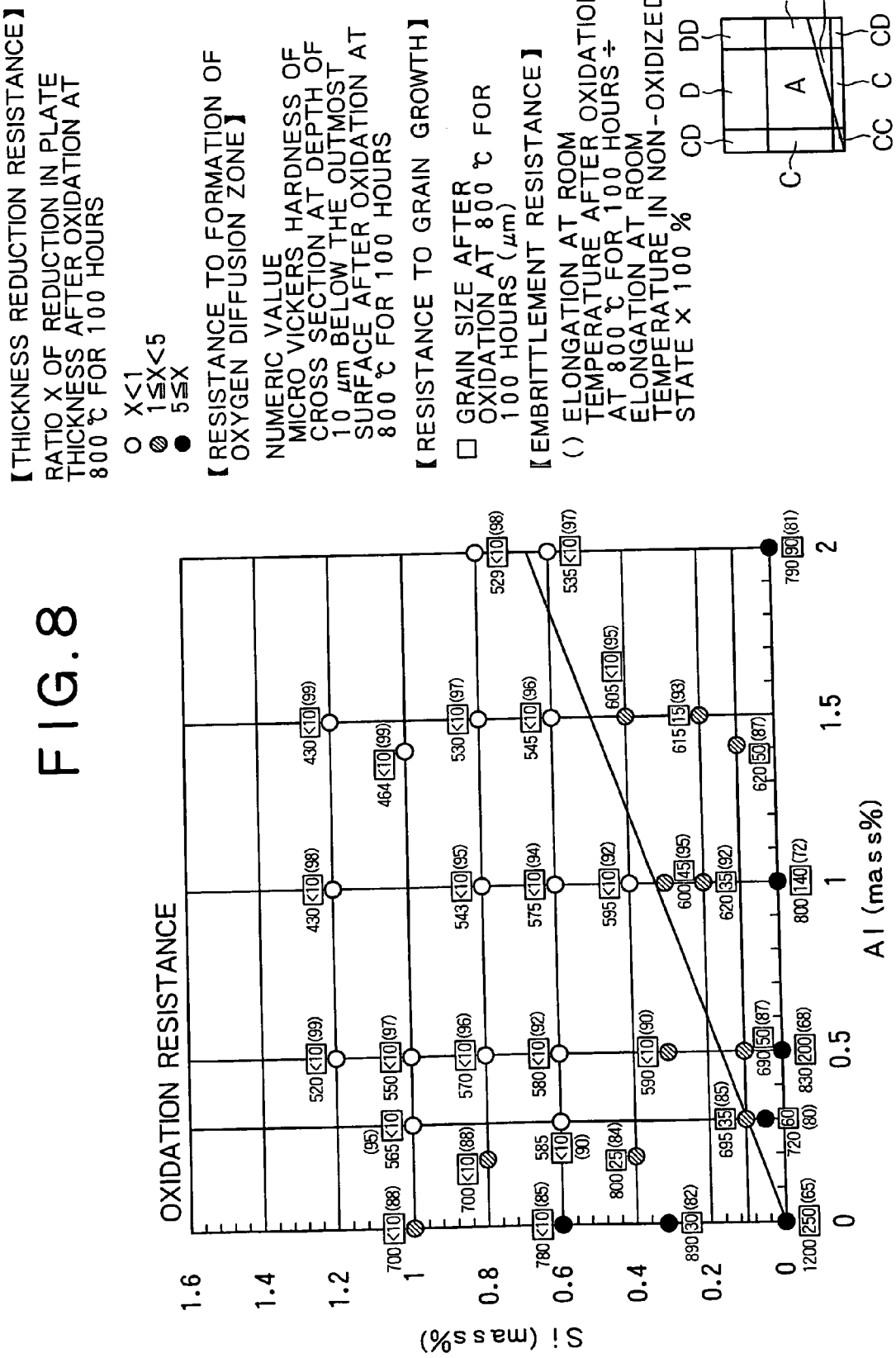

TITANIUM ALLOY HAVING EXCELLENT HIGH-TEMPERATURE OXIDATION AND CORROSION RESISTANCE

BACKGROUND OF THE INVENTION

1. Field of the Invention

The present invention relates to a titanium alloy material with excellent high-temperature oxidation resistance and corrosion resistance, which is useful as an exhaust system material for a vehicle or motorbike (motorcycle), for example. More specifically, the invention relates to a titanium alloy with improved oxidation resistance at high temperatures and corrosion resistance, while having inherent outstanding strength characteristics and corrosion resistance thereof without impairing economy and workability.

A titanium alloy of the invention can be widely applied to various applications where it might be exposed to oxidizing atmosphere or corrosion environment at high temperatures, with its excellent high-temperature oxidation resistance and corrosion resistance. A case where the titanium alloy is used as the exhaust system material will be mainly explained herein.

2. Description of the Related Art

An exhaust system for a vehicle or motorbike is composed of an exhaust manifold, an exhaust pipe, a catalytic muffler, a pre-muffler, and a silencer (main muffler), which are arranged in this order, starting on an exhaust gas outlet side of an engine. (In the description below, these components are referred to as the "exhaust system" individually and collectively.) Although steel was normally used as a constituting material of these exhaust systems in the prior art, stainless steel having good corrosion resistance has been recently used mainly.

In recent years, however, attention is being given to exhaust systems made of titanium mainly for motorbikes. Since the titanium has various kinds of characteristics which involves lightness in weight, good resistance to vibration fatigue, excellent corrosion resistance, small coefficient of thermal expansion, and excellent resistance to thermal fatigue, as compared to the conventionally normal steel and stainless steel. Thus, the titanium exhaust systems have become increasingly standard equipment not only in most motorbikes for races, but also in motorbikes for mass production.

Most of the titanium exhaust systems, which have already been put to practical use, are made of JIS class 2 pure titanium for industrial applications. The temperature of exhaust gas emitted from an engine of the vehicle or motorbike is normally estimated to be greater than 700° C. In the case of a component whose surface is largely open and exposed to the outside air, such as an exhaust system for a motorbike, since heat is diffused from the surface into the air, the temperature of the exhaust system itself does not become so high, and hence the JIS class 2 pure titanium material can be used without trouble. On the other hand, an exhaust system for the vehicle which is not directly open to the outside air, or even a component of the motorbike disposed at a part which merges with an exhaust pipe or pipes, is likely to be heated to a high temperature. Thus, a titanium alloy having higher heat resistance is desired, as compared to the existing JIS class 2 pure titanium material.

From this viewpoint, some kinds of titanium alloys, such as a Ti-3Al-2.5V alloy, or a Ti-6Al-4V alloy, among the existing titanium alloys, are supposed to be useful materials for the exhaust systems. However, in order to form and assemble of the exhaust system, the material needs to be made into a thin sheet and should have excellent workability. Therefore, the above-mentioned two existing titanium alloys which lack formability cannot meet these requirements.

Thus, the present applicant has previously studied titanium alloys so as to develop a titanium alloy having excellent heat and corrosion resistance, and good formability. As a result, the titanium alloy disclosed in an after-mentioned U.S. Pat. No. 6,531,091 has been developed.

This titanium alloy contains Al in an amount ranging from 0.5% to 2.3% by mass. Preferably, the metallographic structure of the titanium alloy comprises α-phase: 90% by volume or more, and β-phase: 10% by volume or less. Such a titanium alloy is expected to serve as a useful exhaust system material which maintains inherent lightness and corrosion resistance thereof, and enhances heat and oxidation resistance, while improving formability, which is important as the exhaust system material.

While the inventors advance research on titanium alloys, the titanium alloy disclosed in U.S. Pat. No. 6,531,091 has been found to leave room for improvement in corrosion resistance (particularly, crevice corrosion resistance) and high-temperature oxidation resistance. That is, the Al content in this titanium alloy is limited to the above-mentioned range so as to have both of formability and high-temperature strength. Furthermore, the inventors thought that the Al content was preferably not less than about 1.5% in terms of usefulness. However, this level of Al content imposes a limitation on durability when the alloy is exposed to a more severe corrosive environment or a high-temperature oxidizing atmosphere. Thus, further improvement is desired by taking the customer's future demands into consideration.

Moreover, the inventors have proposed another invention disclosed in JP-A No. 55725/2003 as another remedial technique concerning the titanium alloy. This invention is applied to frames for glasses as a major use, which have been recently demanded increasingly. The Al content as disclosed in the document is 0.5 to 2.3%, which is the same level as the above-mentioned content in U.S. Pat. No. 6,531,091, while 4% or less of Ga and 1% or less of Si are included in the alloy without substantially including any β stabilizing elements, thereby improving cold-workability and fatigue characteristics after brazing. In the invention disclosed in this document, the maximum Al content is limited to 2.3%, there by ensuring stable formability. And, addition of Si forms microscopic Ti silicide to inhibit growth of grains after brazing, thereby enhancing the fatigue strength. This titanium alloy, which is applied to the frames for glasses as the major use, is used in an ordinary temperature environment, and belongs to a different type of alloy from the titanium alloy which is used in a severe corrosion environment or high-temperature oxidizing environment like the exhaust system material.

SUMMARY OF THE INVENTION

In view of the above-mentioned prior art, the inventors have an object to improve the titanium alloy, in particular, disclosed in the foregoing U.S. Pat. No. 6,531,091, and to provide a titanium alloy that has markedly improved high-temperature oxidation resistance and corrosion resistance, while maintaining the other features of the original titanium alloy.

A titanium alloy having excellent high-temperature oxidation resistance and corrosion resistance, which can solve the above-mentioned problems, is characterized by that, the alloy comprises, by mass, Al: 0.30–1.50%, and Si: 0.10–1.0%, preferably that a mass ratio Si/Al is not less than 1/3. The titanium alloy of the invention may further comprise Nb: 0.1–0.5% by mass as another element. The alloy may further comprise at least one element selected from the group consisting of Ta, W, Mo, Cr, Zr, and Hf as another element, wherein a total amount of the additional alloying elements including Al, Si, and Nb is desirably not more than 2.5% by mass.

Although the titanium alloy of the invention itself has excellent high-temperature oxidation resistance, formation of aluminum-based plating on a surface of the titanium alloy material is more preferable because it can exhibit markedly outstanding high-temperature oxidation resistance.

The thus-obtained titanium alloy of the invention can be effectively utilized as various members which might be exposed to a high-temperature oxidizing atmosphere and a severe corrosion environment. More specifically, this alloy is very useful as an exhaust system for a vehicle or motorcycle (including individual exhaust system components, such as an exhaust manifold, an exhaust pipe, a catalytic muffler, a pre-muffler, and a silencer (main muffler)). Furthermore, the alloy is also useful as an exhaust system for a ship, an exhaust gas duct for a factory, a lining material for a chimney or flue, or the like.

In the titanium alloy of the invention, as compared to the conventional titanium alloy, the Al content is relatively less, and a small amount of Si and/or Nb is added, thereby improving further corrosion resistance, exhibiting high-temperature oxidation resistance which is superior to the conventional material, and enhancing the quality of the titanium alloy exhaust system

BRIEF DESCRIPTION OF THE DRAWINGS

FIG. 8 is a graph showing influences of the amounts of Al and Si included in the Ti alloy, on high-temperature oxidation resistance (thickness reduction resistance, resistance to formation of an oxygen diffusion zone, resistance to grain growth, embrittlement resistance)

DESCRIPTION OF THE PREFERED EMBODIMENTS

Figure 1:
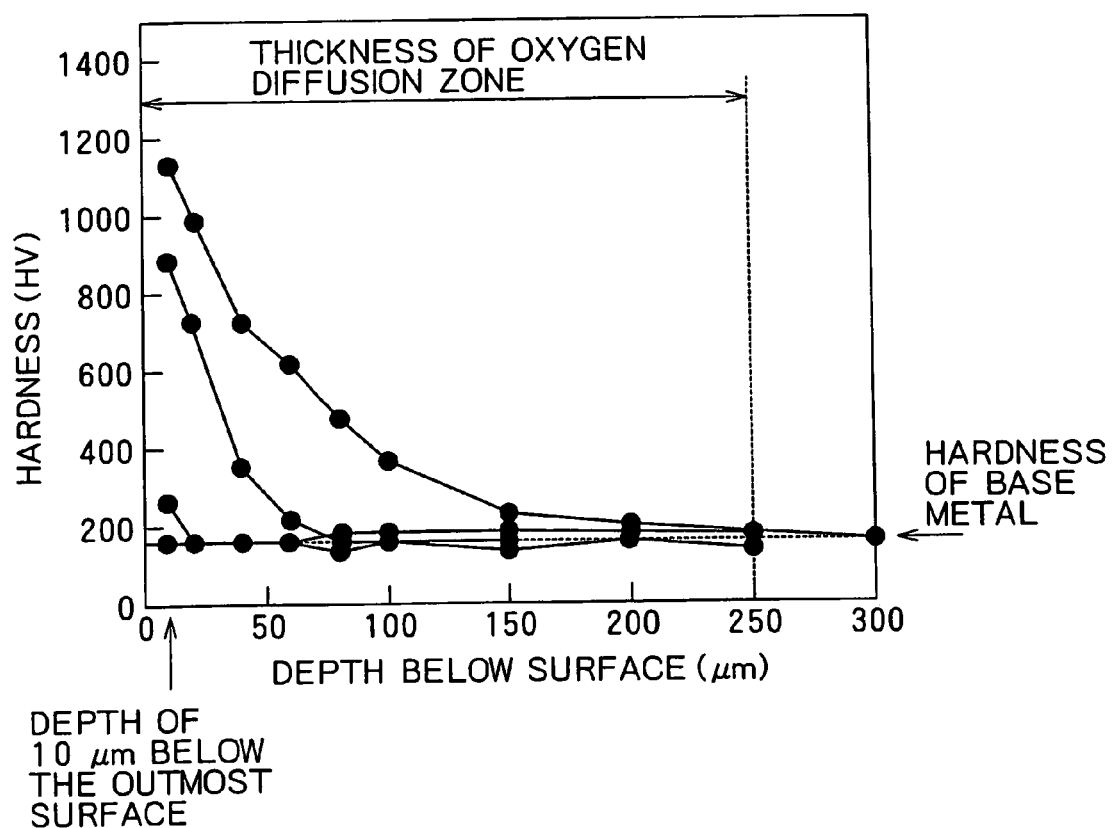
FIG. 1 is a graph showing a relationship between a depth of an oxygen diffusion zone below the outmost surface of a Ti—Al alloy and a Vickers hardness (Hv) of a point at the depth.

The inventors have studied titanium alloys back to a criterion for performance evaluation so as to develop a titanium alloy which has better quality than that of the titanium alloy disclosed in the above-mentioned U.S. Pat. No. 6,531,091 as well as that of the pure titanium conventionally used as an exhaust system material under a condition as described in the foregoing background art. The reason for this study is as follows.

That is, an evaluation method of oxidation resistance adopted by the disclosure of the above-mentioned U.S. Pat. No. 6,531,091 evaluates a level of oxidation resistance of each alloy by increase in weight due to oxidation after keeping at 700° C. for 20 or 40 hours. When a testing temperature reaches a high temperature that exceeds 700° C., an oxidation scale layer is drastically formed, and the scale layer grown thickly peels off, thus causing thickness reduction. As a result, since the weight of the alloy is rather decreased due to oxidation, the high-temperature oxidation resistance cannot be evaluated using the weight increase due to the oxidation. Further, when the temperature reaches a high temperature that is not less than 700° C., the oxidation scale layer is drastically formed, while oxygen is diffused into and invades titanium metal, so that the firm and fragile oxygen diffusion zone is formed (when an oxygen concentration of the oxygen diffusion zone exceeds a predetermined level, it is converted into the oxidation scale layer). A condition of formation of the oxygen diffusion zone cannot be grasped based on the weight increase due to the oxidation. Furthermore, when the testing temperature exceeds 700° C., grain growth occurs markedly, which leads to embrittlement and reduction in fatigue strength.

Therefore, evaluation of the oxidation resistance needs to take into consideration a condition of grain growth, in addition to the oxidation weight gain, the thickness reduction, and the degree of formation of the oxygen diffusion zone.

That is, assuming a severe high-temperature oxidizing atmosphere intended by the invention, for a performance evaluation matched with practical use, it is necessary to establish a testing method that is capable of quantitatively grasping the following features: 1) thickness reduction in a sampling titanium alloy sheet due to a thickness reduction, which might directly lead to perforation thereof, 2) a condition of formation of an oxygen diffusion zone, which might lead to degradation in strength, 3) coarsening of grains, which directly leads to embrittlement and degradation in fatigue strength of the titanium alloy, and the like.

Thus, to classify differences of the titanium alloy of the invention from the conventional pure titanium material and the titanium alloy disclosed in the above-mentioned U.S. Pat. No. 6,531,091, the evaluation method of the high-temperature oxidation resistance is defined as follows.

[Thickness Reduction Resistance]

A sampling titanium alloy sheet (having a length of 100 mm, and a width of 10 mm) having a thickness of about 1 mm is inserted into a furnace, the inside of which is kept in an environment of atmospheric composition, and heated to and kept at 800° C. for 100 hours. Then, a section of the sheet is observed by an optical microscope.

In the observation by an optical microscope, in the same way as observation of ordinary microstructure in a section, the sampling sheet is set in a resin in the direction in which the section can be observed and then the section undergoes mirror polishing. Thereafter, a thickness of a metal portion of the sheet ($X_1$) is measured. When the sampling sheet processed as above is observed by an optical microscope, the metal portion is observed as a white portion. (Since a portion corresponding to oxidation scale formed on the surface is observed as a dark gray portion, the metal portion can be clearly distinguished from the oxidation scale portion.) And based on the measured value, a rate of reduction in sheet thickness is determined from an amount of decrease in sheet thickness with respect to a thickness ($X_0$) before high-temperature oxidation, using the following formula. In addition, the thickness reduction resistance is determined by averaging the reduction rates at 10 measurement points.

Rate of reduction in sheet thickness (%)=$[(X_0-X_1)/X_0] \times 100$

[Resistance to Formation of Oxygen Diffusion Zone]

A sampling titanium alloy sheet (having a length of 100 mm, and a width of 10 mm) having a thickness of about 1 mm is inserted into a furnace, the inside of which is kept in an environment of atmospheric composition, and heated to and kept at 800° C. for 100 hours. Then, the sampling sheet is cut at its center. Micro Vickers hardnesses ($H_v$) of ten points located at a depth of 10 μm below the cut cross-sectional surface of the metal titanium alloy part are averaged to evaluate the resistance to formation of the oxygen diffusion zone. It should be understood that the smaller the value of Vickers value Hv obtained, the better the resistance to the oxygen diffusion zone formation.

Note that FIG. 1 is a graph showing a relationship between a depth below a sampling surface of each of some titanium alloy sheets, and the Micro Vickers hardness (Hv) value thereof. The sampling surface is obtained by cutting after keeping at 800° C. for 100 hours in an oxidizing atmosphere, as an interface between an oxidation scale layer and a base material part. In this graph, a range of a part which has the greater degree of hardness than that of a base (hardness corresponding to that of non-oxidized part) corresponds to a thickness of the oxygen diffusion zone. The ranking of the thicknesses can be provided by comparing the Micro Vickers hardnesses (Hv) of the points at the depth of 10 μm below the outmost surfaces. It should be understood that the greater the Vickers hardness (Hv) value, the deeper the oxygen diffusion zone.

[Resistance to Grain Growth]

A sampling titanium alloy sheet having a thickness of about 1 mm, a length of 100 mm, and a width of 10 mm is inserted into a furnace, the inside of which is kept in an environment of atmospheric composition, and heated to and kept at 800° C. for 100 hours. Then, the sampling sheet is cut at its center. The cross-sectional surface cut is taken a photograph of, using a microscope of a magnification of 100 times. The photograph of the surface is subjected to image analysis to determine a grain size at each of 10 measurement points. All grain sizes at these 10 points are averaged to determine an average grain size.

Figure 2:
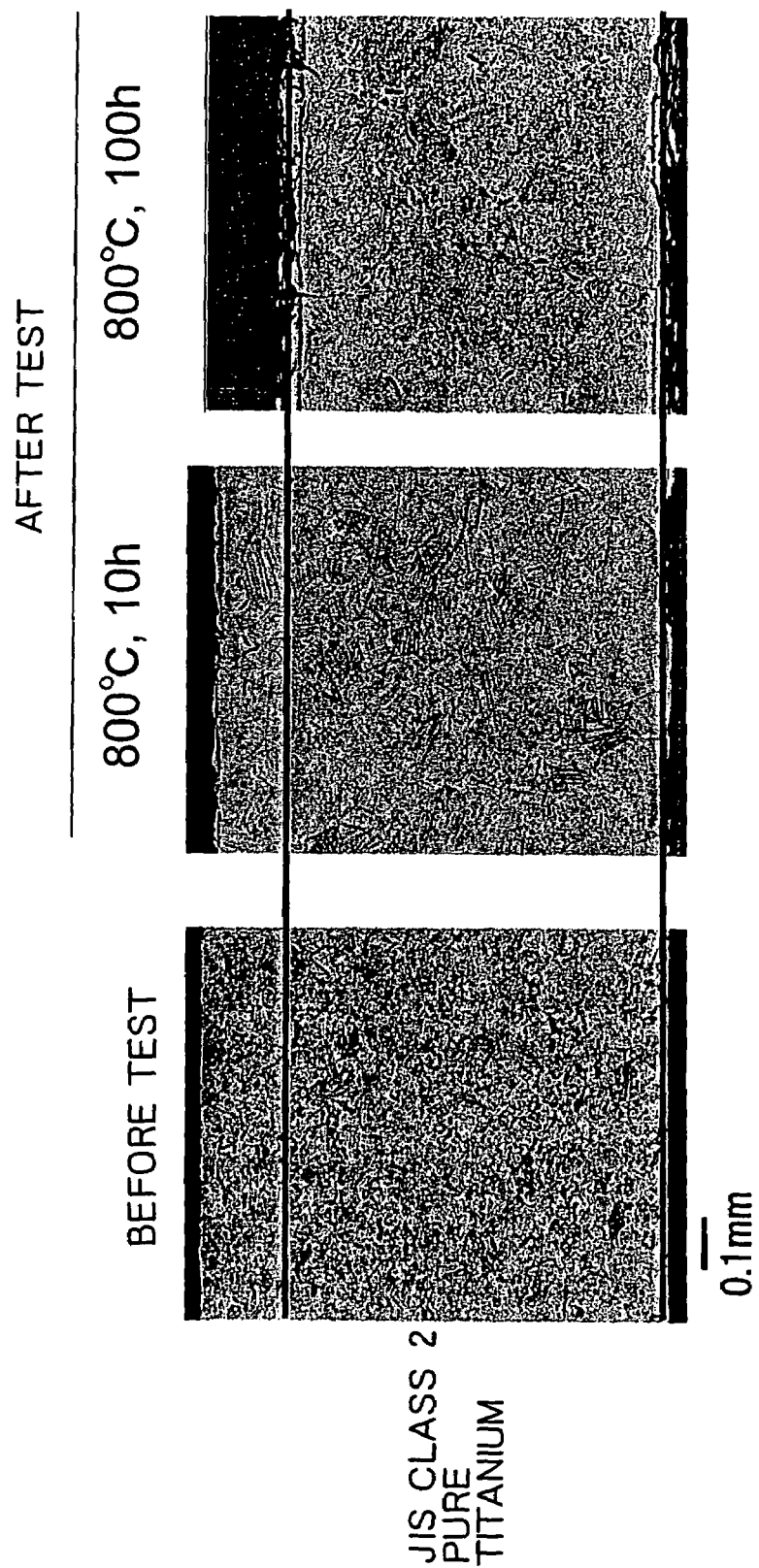
FIG. 2 shows microstructures of JIS class 2 pure titanium before and after exposure in air at 800° C. for 10 hours and at 800° C. for 100 hours.

Note that FIG. 2 shows microphotographs of cross sections before and after a test of high-temperature oxidation resistance of a JIS class 2 pure titanium sheet for reference, wherein the left photograph corresponds to the sheet before the test (before heating), the central photograph to the sheet after heating at 800° C. for 10 hours, and the right photograph to the sheet after heating at 800° C. for 100 hours, respectively. As can be seen from these photographs, the grain size after the heating test becomes relatively large with respect to the average grain size before the test. It should be noted that increase in the heating time from 10 hours to 100 hours leads to considerable reduction in thickness of the sheet.

[Embrittlement Resistance]

Figure 3:
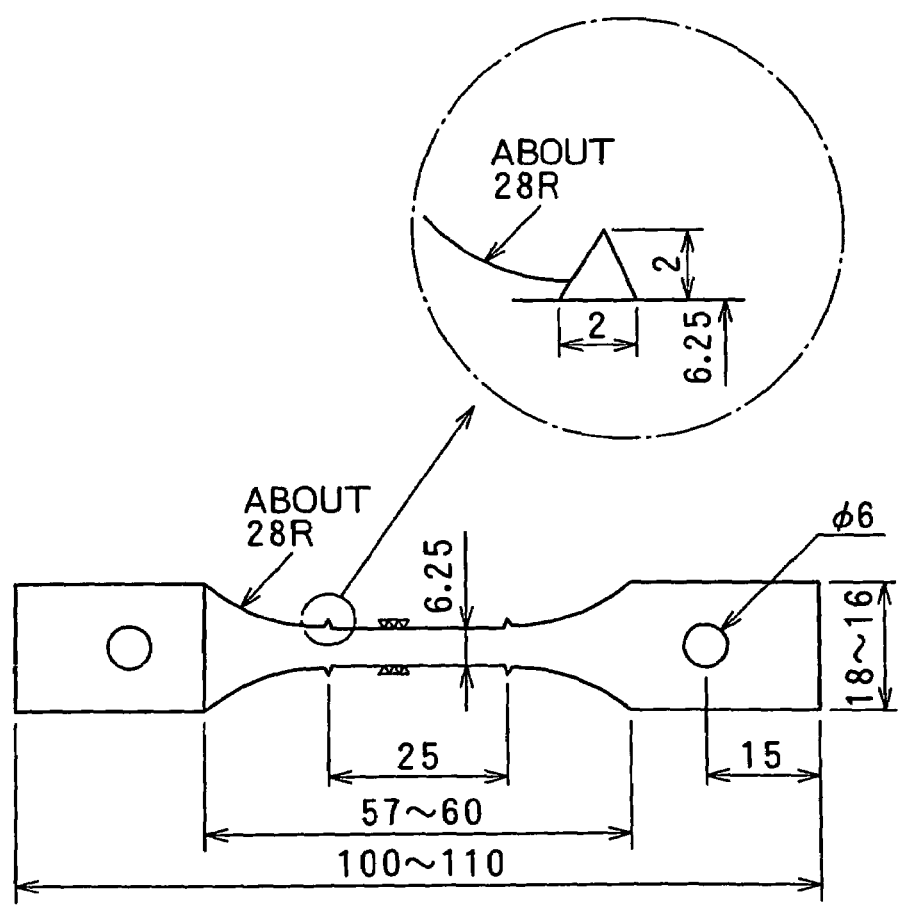
FIG. 3 is an explanatory diagram showing a dimension and a shape of a testing piece used in an evaluation test of high-temperature oxidation resistance.

A testing piece is cut from a sampling titanium alloy sheet having a thickness of 1 mm in a dimensional shape shown in FIG. 3. The testing piece is inserted into a furnace, the inside of which is kept in an environment of atmospheric composition, and heated to and kept at 800° C. for 100 hours. Thereafter, the piece is subjected to a tensile test using a tensile testing machine "Autograph AG-D precision universal testing machine", produced by Shimadzu Corporation. This measurement is performed over 10 times, so that, the results of 10 measurements are averaged to determine embrittlement resistance of $[(l_1/l_0) \times 100$ (%)], based on a measured elongation ($l_1$) of the obtained sheet at ordinary temperature and an elongation ($l_0$) of the sheet in a non-oxidized state at ordinary temperature.

On the other hand, the pure titanium used as a conventional material has excellent corrosion resistance. Addition of alloying elements, such as Al or Si, so as to enhance high-temperature oxidation resistance, leads to reduction in the corrosion resistance, which possibly exposes a problem of corrosion. Accordingly, the invention further adds an item of the corrosion resistance, which has not been evaluated in the prior art exhaust system material, to evaluation items.

That is, on a road in a cold district, salt (sodium chloride, calcium chloride, or the like) is dispersed for the purpose of prevention of road surface freezing, which causes depositing of the salt on an exhaust system surface of the vehicle or motorcycle traveling on the road. This salt is heated by heat of the exhaust system in a coexistence state with water, thus causing crevice corrosion, which further possibly leads to perforation defects. To cope with such a problem, the following two testing methods are used to evaluate the corrosion resistance.

[General Corrosion Test]

As an accelerated test which simulates a corrosion environment inside the exhaust system, a sampling titanium alloy sheet is soaked in a boiling 1% $H_2SO_4$ solution for 48 hours, and then the weight of the sheet is measured. Based on the measured weight, reduction in weight is determined from the weight of the sheet before the corrosion test. 10 samples are subjected to this test to measure the respective weight reduction, thus averaging them. The average weight reduction and an area of all samples before the test are used to calculate a weight reduction due to corrosion per year (mm/year).

[Crevice Corrosion Test]

As an accelerated test which simulates a crevice corrosion environment in a coexistence state with salt and water, a sampling titanium alloy sheet is soaked in a boiling 10% NaCl solution for 240 hours, and then a rate of occurrence of crevice corrosion is determined. More specifically, in this test, 32 crevices are formed by a multi-crevice method, and how many crevices among them have corroded is measured to determine the occurrence ratio (see Japanese Patent Publication No. 2871867, for more details of the test method).

The important required properties of the titanium alloy are still strength and workability, when putting into practical use the titanium alloy as an exhaust system material instead of the conventional pure titanium. Among such properties, a tensile property (tensile strength, and elogation) is evaluated in accordance with the normal method by JIS H4600, JIS Z2201, and 2241, and formability by the Erichsen test (JIS Z2247).

The inventors adopted the above-mentioned testing methods so as to consider an appropriate content of Al and Si included in the titanium and an effect thereof.

Aluminum (Al) is an alloying element having the effect of enhancing heat resistance of the titanium material, as is well known to the public. As the Al content becomes larger, the heat resistance and the high-temperature oxidation resistance (thickness reduction resistance, resistance to formation of an oxygen diffusion zone, and resistance to grain growth) are improved. On the other hand, as the Al content becomes larger, the ductility is drastically reduced, while the corrosion resistance is also reduced. It is desirable that, taking these merits and demerits into consideration, in order to ensure the minimum formability and corrosion resistance required for the exhaust system material or so, while obtaining high-level heat and high-temperature oxidation resistance, the Al content should be at least 0.30%, or preferably not less than 0.40%; and not more than 1.50%, preferably 1.0% or less, or more preferably 0.8% or less.

Next, it has already been shown that Si exhibits an excellent effect of inhibiting growth of the grains of the titanium alloy, and contributes to improvement of fatigue property. This effect is effectively exhibited in the invention. An addition effect of Si according to the invention, which is worthy of special mention, is that the combination of addition of Al and Si contributes to the improvement of high-temperature strength, while minimizing degradation in the corrosion resistance, and enhancing the high-temperature oxidation resistance, especially the thickness reduction resistance, and the resistance to formation of the oxygen diffusion zone. Further, this contributes to the improvement of the fatigue property and the embrittlement by the inhibition of the grain growth.

To effectively produce such an effect of Si, Si needs to be contained in an amount of 0.10% or more in the alloy, preferably 0.20% or more, or more preferably 0.30% or more. The excessive amount of Si has an adverse affect on the corrosion resistance, which is unignorable, and degrades formability. Thus, it is desirable that the Si content should be not more than 1.0%, preferably 0.8% or less, or more preferably 0.7% or less.

As mentioned above, the Si minimizes the degradation in the corrosion resistance due to the addition of Al, while exhibiting the improvement effect of the high-temperature resistance, which effect has appropriately the same level as that of the only Al. In other words, in order to effectively exhibit the effect of the Si serving as a substituting element of Al, the mass ratio of the Si content to the Al content is not less than one-third, preferably not less than half, or more preferably not less than four-fifths. Note that since the excessively large mass ratio makes it difficult to effectively produce the effect expected from the Al, especially the effect of improving the high-temperature resistance, the ratio should be limited to, preferably 2.0 or less, or more preferably 1.5 or less.

As mentioned above, the titanium alloy of the invention is characterized that the appropriate amounts of Al and Si are contained in the alloy so as to ensure the formability required for the exhaust system material or the like, while enhancing the excellent high-temperature oxidation resistance and the corrosion resistance. The most simple alloy composition, which is preferable constituted by taking into consideration costs of raw materials and economies of mass production, is the composition of a ternary alloy consisting of Ti-(0.30–1.50%)Al-(0.10–1.0%)Si. Preferably, the addition of Nb in an appropriate amount further enhances the thickness reduction resistance and the resistance to formation of the oxygen diffusion zone without having any adverse effect on the corrosion resistance. Such an effect of the Nb is effectively produced when the Nb content is not less than 0.10% by mass, preferably 0.15% by mass or more. The excessive amount of the Nb adversely affects the corrosion resistance and the formability, and is disadvantageous from an economical standpoint because it is a relatively expensive element. For this reason, the Nb content is preferably not more than 0.5%, more preferably 0.3% or less.

The additional allowable element other than the above-mentioned one is Ta, W, Mo, Cr, Zr, Hf, and the like. The use of each individual one of these elements, or arbitrary combination of two or more elements contributes to the improvement of the thickness reduction resistance and the resistance to formation of the oxygen diffusion zone, and exhibits an effect of inhibiting the grain growth, which is not so great as an effect of Si, and also another effect of enhancing the fatigue property and the embrittlement. These effects are effectively produced by containing at least one of these elements in an amount of 0.1% by mass or more in total. The excessive amounts of these alloying elements, however, produce an adverse effect on the formability. For this reason, the total amount of the alloying elements, including the content of the above-mentioned Al, Si, and Nb should be adjusted not to exceed 2.5%, preferably 2.0%.

The remainder in a titanium alloy of the present invention is substantially titanium. The term "substantially" here means that natural addition of very small amount of elements which come depending on a kind of raw titanium (ore, scrap, refining method and so on) is allowable. The elements are exemplified as O, Fe, H, C, N and so on. The specific upper limit of the content of the element is determined so that the element does not produce an adverse effect on the aforementioned properties of the present invention. The upper limit varies depending on the element. In the present invention, allowable contents of the elements are defined as 0.15% or less (preferably 0.12% or less) of O, 0.20% or less (preferably 0.15% or less) of Fe, 0.03% or less (preferably 0.015% or less) of H, 0.08% or less (preferably 0.03% or less) of C, and 0.15% or less (preferably 0.12% or less) of O, and 0.05% or less (preferably 0.03% or less) of N.

Other than the elements above, elements which may be naturally contained in the titanium alloy of the invention are Ni, Cl, Mg, Mn, Na, Cu, V, Sn, Pb, Ru, Co, and S. It is allowable that the titanium alloy of the invention contains very small amounts of those elements, so long as the elements do not produce an adverse effect to the aforementioned properties (heat resistance, corrosion resistance, formability and so on), regardless of the route in which the elements are added to the alloy. The amounts should be restricted below some hundreds ppm level.

Note that since the titanium alloy of the invention has the cold rolling property and the formability comparable to the conventional pure titanium, as described above, as a method for manufacturing an exhaust system material or an exhaust system using this alloy may be adopted the known method using the pure titanium. For example, components of raw materials are adjusted to a predetermined alloy composition in a solution to manufacture an ingot, and then the ingot is subjected to forging and hot rolling in the usual manner. Thereafter, the ingot is subjected to annealing to remove the scale layer on its surface. Subsequently, the annealed ingot is subjected to cold rolling until it has a predetermined thickness, and then is annealed again. The thus-obtained coil is slit to form a hoop. This hoop is sequentially formed in a tubular shape with a tube manufacturing machine, and then subjected to TIG welding to manufacture a welded tube. Then, the tube may be integrated with an end sheet made of a pure titanium or a titanium alloy (preferably, the titanium alloy of the invention), which is dimensioned and shaped, to be processed into an exhaust system shape.

During this processing, the conditions for the hot rolling, the cold rolling, the annealing, the tube welding, and the like may be appropriately adjusted depending on the component composition of the titanium alloy used in each case.

As mentioned above, in the invention, the amounts of Al and Si contained in the titanium are specified, or additionally an appropriate amount of Nb is included in the titanium, or alternatively at least one element selected from the group consisting of Ta, W, Mo, Cr, Zr, and Hf is included in the titanium. This ensures the excellent formability, while enhancing the corrosion resistance, the high-temperature oxidation resistance (the thickness reduction resistance, the formation property of oxygen diffusion zone, and the inhibition property of grain growth), the heat resistance, and the like. It should be noted that a surface treatment that imparts the improved high-temperature oxidation resistance and corrosion resistance to the surface of a product made of the titanium alloy of the invention, is very useful in further lengthening a life-cycle of the exhaust system material or the like.

Such a protective film is preferably made of hot-dip Al plating or Al alloy plating. Preferably, the hot-dip Al plating or Al alloy plating is an Al alloy plating having heat resistance, in which a total amount of Al, or of Al and Si is not less than 90 mass %. The thickness of the Al plating is preferably 1 µm or more, more preferably 5 µm or more. An Al—Ti based intermediate compound, such as $Al_3Ti$, preferably intervenes between the Al-based hot-dip plating layer and a titanium alloy substrate, to thereby enhance adhesion between the substrate and the plating layer.

Now, the influence of the Al and Si contents in the titanium alloy of the invention on the tensile property, the Erichsen value (formability), the corrosion resistance, and the oxidation resistance will be described hereinafter with the accompanying drawings organized to include examples described below.

Figure 4:
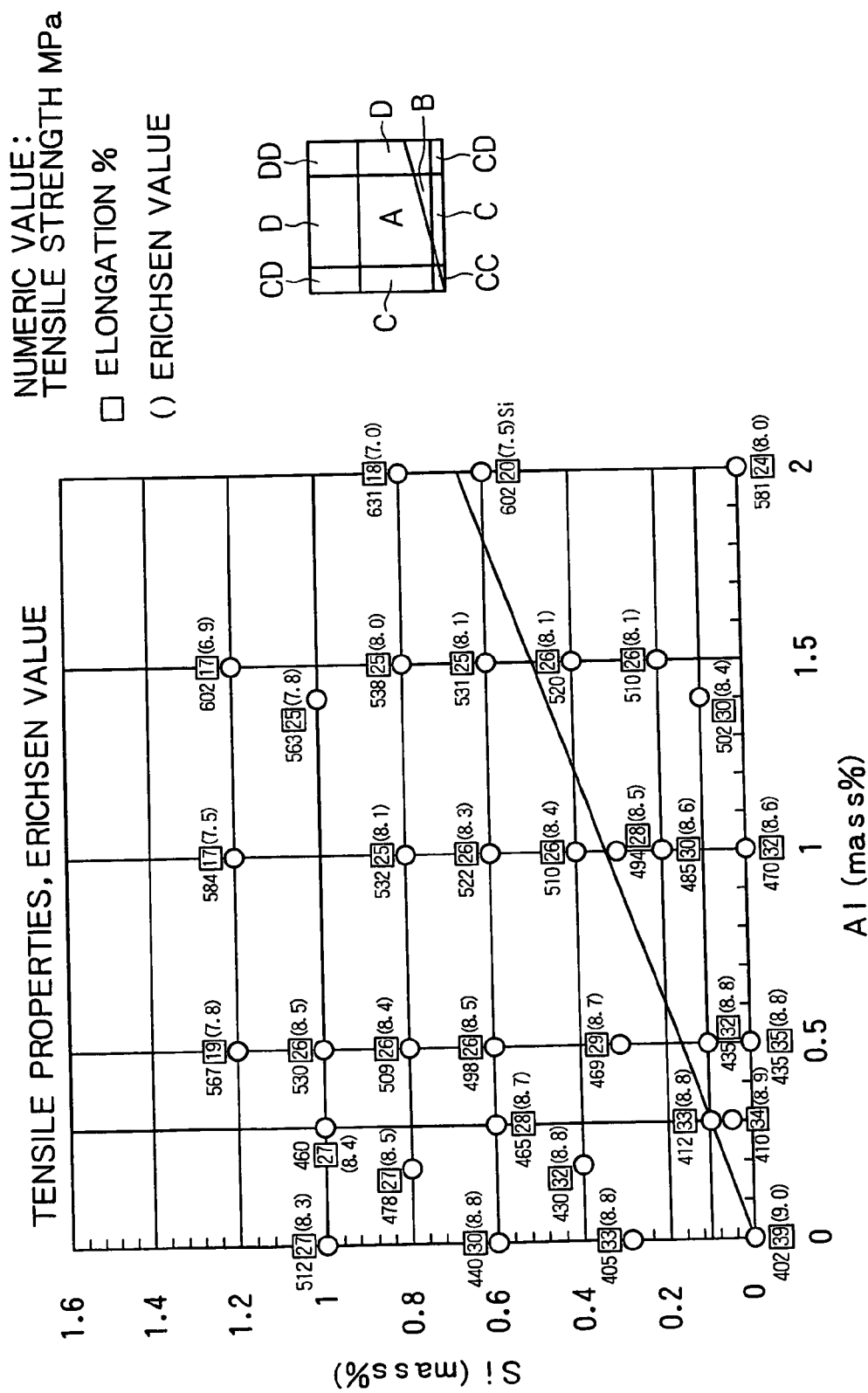
FIG. 4 is a graph showing influences of the amounts of Al and Si included in a Ti alloy, on tensile properties and Erichsen values.

FIG. 4 is a graph showing the influences of the amounts of Al and Si included in the titanium alloy on the tensile properties and the Erichsen values. In the graph, at a measurement point designated by a ○ mark, a numeric value surrounded by a square indicates an elongation (%), a value surrounded by a round bracket ( ) indicates the Erichsen value, and a single numeric value indicates a tensile strength (MPa). Note that a position of Al:0% and Si:0% means JIS class 2 pure titanium.

A miniature located on a right side in the drawing is an explanatory diagram in which reference numerals A, B, C, D, CD, CC, and DD illustrates respective relationships with requirements for claims of the invention in the form of area. An upward-sloping straight line indicates "Si=⅓×Al", and the areas A and B indicates areas to meet both of the following conditions defined in the invention: Al=0.30–1.50%; and Si=0.10–1.0%. The area C corresponds to a comparative material in which a mass content of one of Al and Si is appropriate, but a mass content of the other is deficient. The area D corresponds to a comparative material in which a mass content of one of Al and Si is appropriate, but a mass content of the other is excessive. The area CD corresponds to a comparative material in which a mass content of one of Al and Si is deficient, but a mass content of the other is excessive. The area CC corresponds to a comparative material in which both Al and Si mass contents do not reach a predetermined range. The area DD corresponds to an area of a comparative material in which both Al and Si contents exceed the respective predetermined ranges.

A comprehensive analysis of the tensile strength, the elongation ratio, and the Erichsen value designated at each point in the figure enables readout of the following tendency.

That is, in the area CC, any one of the Al and Si contents does not meet a predetermined range, so that the Erichsen value is high. This area is an area which is nonproblematic in view of formability. In the area C, the mass content of one of Al and Si is appropriate, but the other is deficient, which results in relatively high Erichsen value, and good forming property. In the area D, the mass content of one of Al and Si is appropriate, but the mass content of the other is too much, which results in relatively high strength and Erichsen value, and in poor formability. In the area CD, the mass content of one of Al and Si is excessive, the mass content of the other is deficient, which results in remarkable decrease in the Erichsen value due to the excessive component, and lacks the formability. An area DD is an area where the Al and Si mass content are both excessive, which results in the high strength, the low Erichsen value, and the poor formability.

In contrast, the areas A and B meet predetermined requirements of the invention. As compared to JIS class 2 pure titanium (wherein the amounts of Al and Si are set zero %), the areas A and B have the slightly higher tensile strength, and the slightly lower elongation and Erichsen value. Even if so, this type of alloy is estimated to have the same formability as that of the pure titanium from a practical standpoint.

Figure 5:
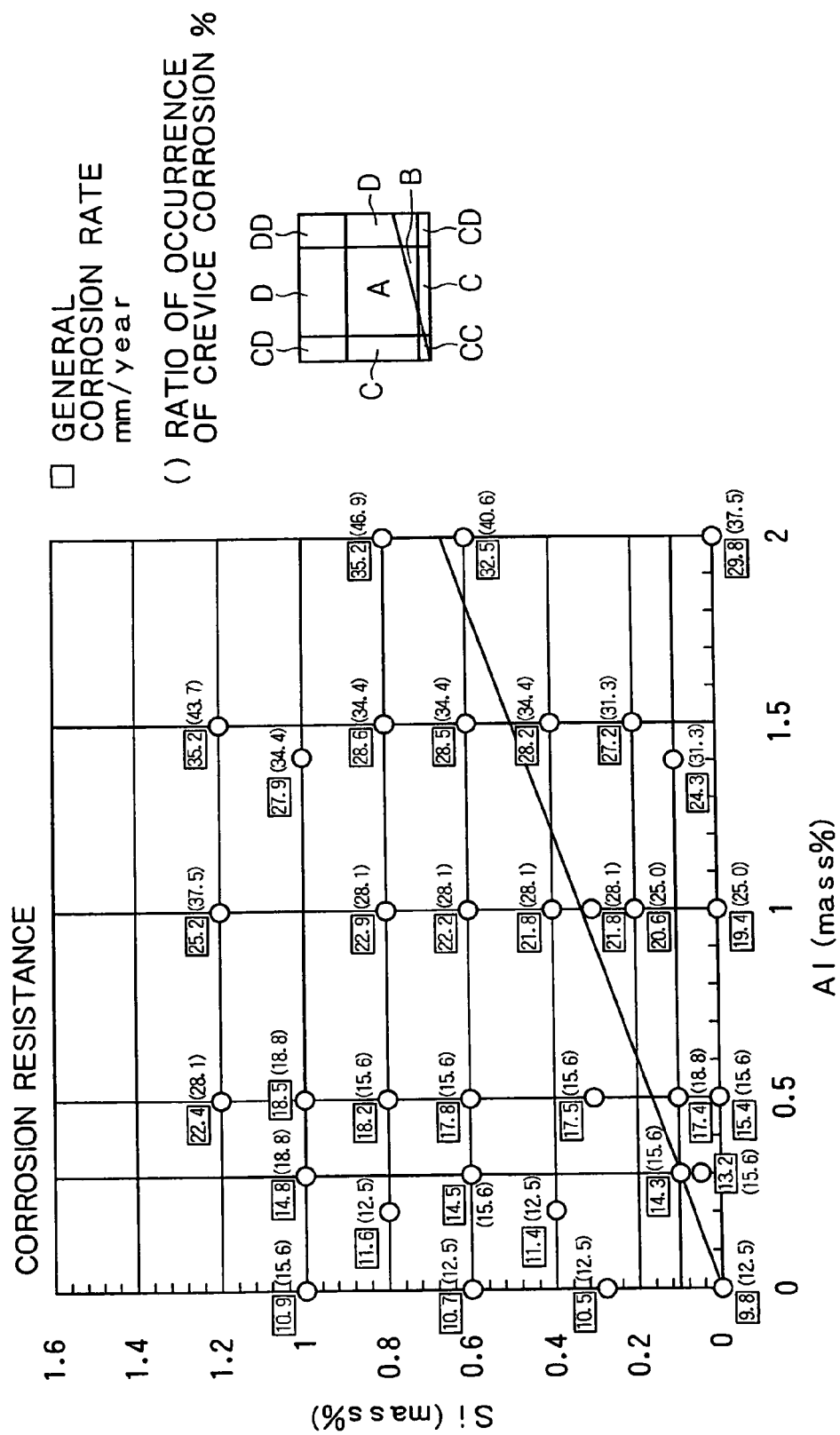
FIG. 5 is a graph showing influences of the amounts of Al and Si included in the Ti alloy, on corrosion resistance (general corrosion rate, and ratios of occurrence of crevice corrosion).

FIG. 5 is a graph organizing the influences of the amounts of Al and Si included in the titanium alloy on the corrosion resistance. In the graph, at a measurement point designated by a ○ mark, a numeric value surrounded by a square indicates an entire surface corrosion speed (mm/year), and a value surrounded by a round bracket ( ) indicates a ratio of occurrence of crevice corrosion (%) Note that because the conditions for these tests are those conditions as mentioned above and any one of the conditions is harder than an actually used condition, corrosion does not occur at a level shown, under the actually used condition.

Reference numerals A, B, C, D, CD, CC, and DD illustrated in a miniature located on a right side of the drawing mean the same as those numerals explained in the above-mentioned miniature of FIG. 4.

A comprehensive analysis of the entire surface corrosion speed and the ratio of occurrence of crevice corrosion designated at each point in the figure enables readout of the following tendency.

In the area CC, both the Al and Si contents do not meet respective predetermined ranges, so that the entire surface corrosion speed and the ratio of occurrence of crevice corrosion in this area have approximately the same levels as those of JIS class 2 pure titanium material. In the area C, the mass content of one of Al and Si is appropriate, but that of the other is deficient, which leads to less reduction in the corrosion resistance as well as in the entire surface corrosion speed and the crevice corrosion occurrence ratio, as compared to other areas. In the areas D and DD, the amount of one or both of Al and Si is excessive, which shows the higher entire surface corrosion speed and crevice corrosion occurrence ratio than those in other areas. In the area CD, the mass content of one of Al and Si is deficient, but the mass content of the other is excessive, which results in the inadequate entire surface corrosion speed and ratio of occurrence of crevice corrosion due to the strong influences of excessive alloying elements.

In contrast, the areas A and B are preferable areas that meet predetermined requirements of the invention. Although the areas A and B have the corrosion resistance inferior to that of the areas CC and C, they have a slightly reduced degree of degradation as compared to those of other areas.

As shown in the graph, in a case where each of the elements Al and Si is individually added to the titanium, the addition of Al causes degradation in the corrosion resistance to a greater degree than the addition of Si. Furthermore, a composite addition of Al and Si obviously reduces upward trends of the entire surface corrosion speed and the ratio of occurrence of crevice corrosion more largely than those for a single addition of Al, when the total additional amount of Al and Si is the same as that of the single Al.

Figure 6:
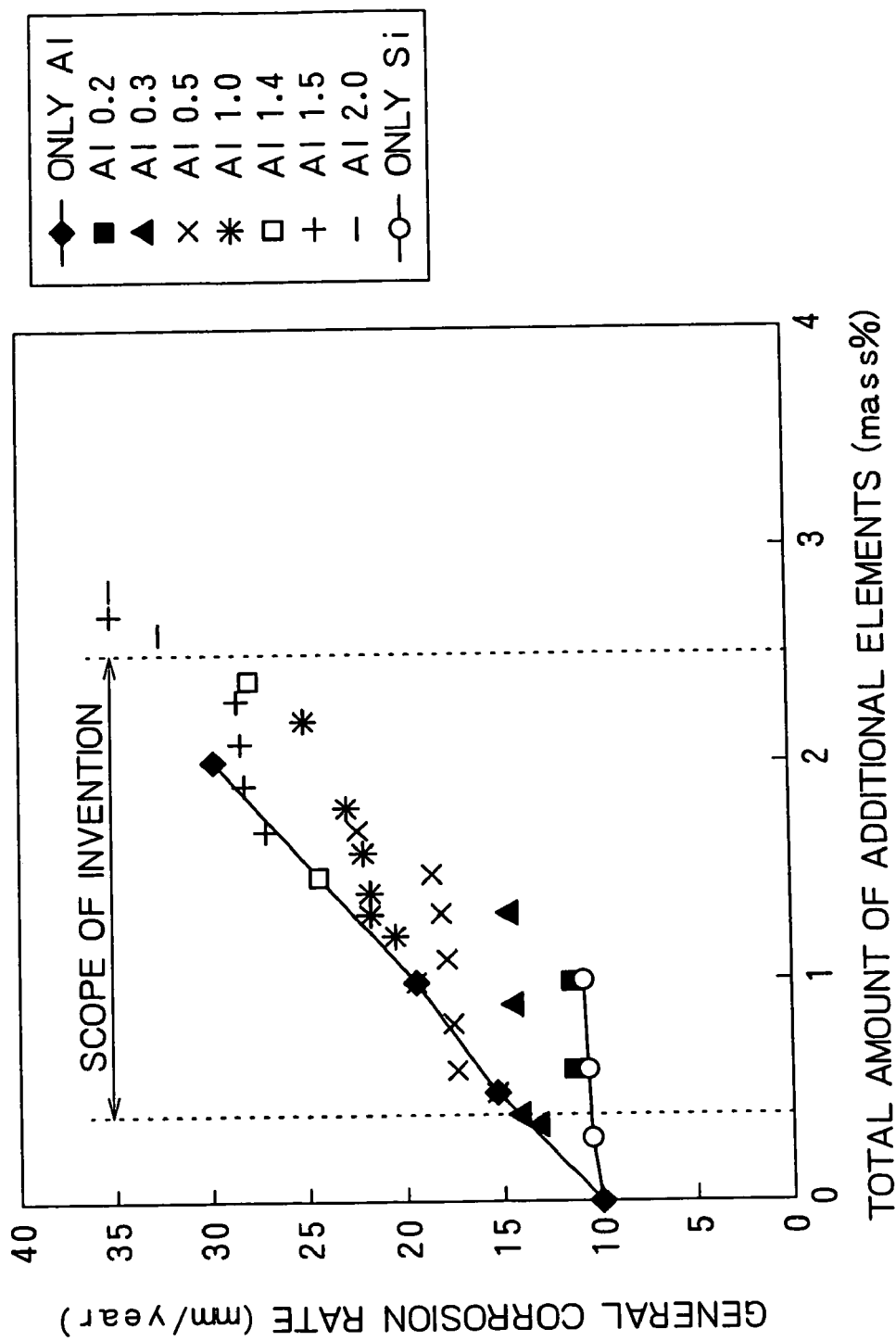
FIG. 6 is a graph showing influences of the Al content (amount of addition) of the Ti alloy and the total amount of additional elements including Si, on general corrosion rate.
Figure 7:
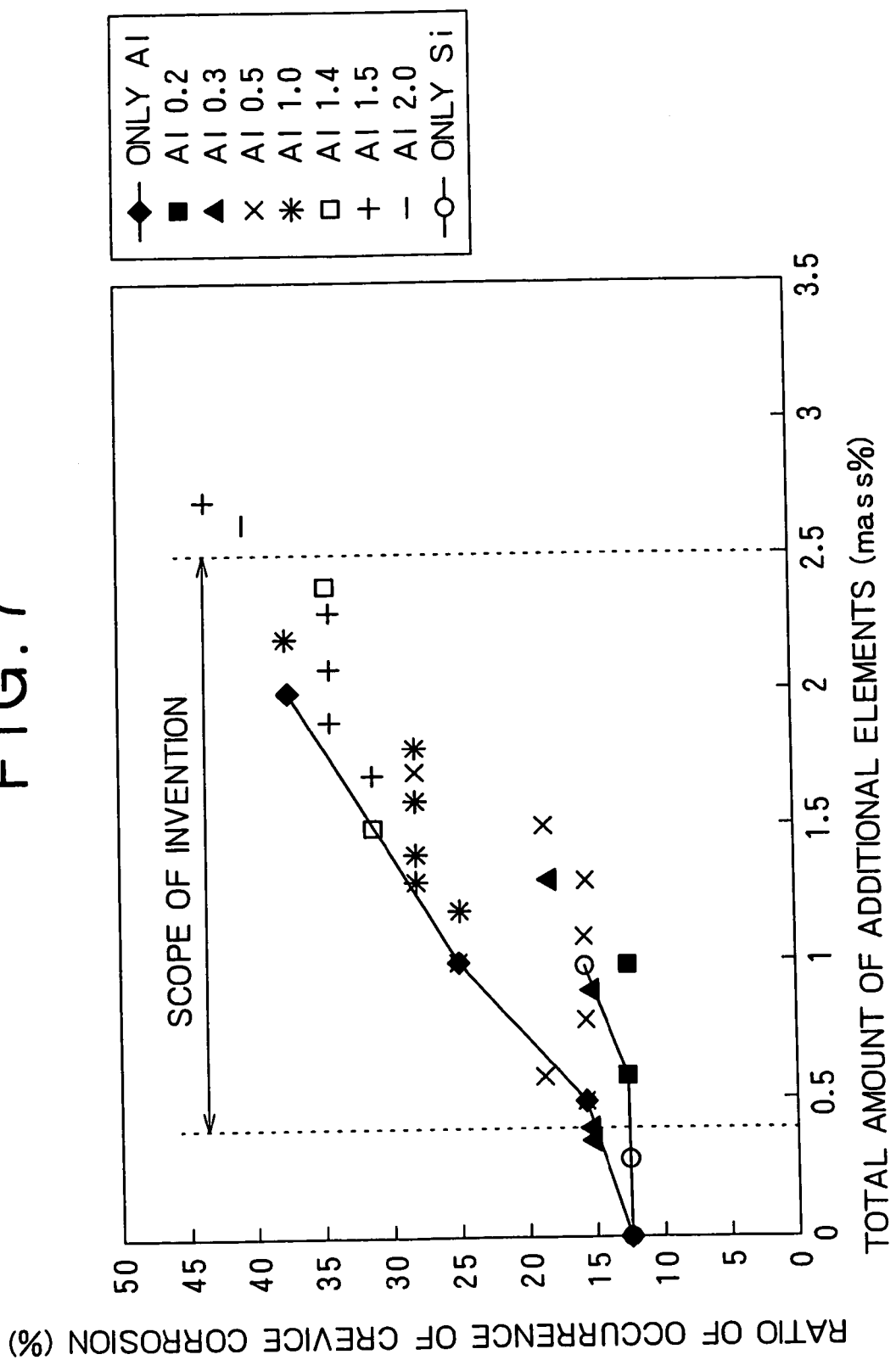
FIG. 7 is a graph showing influences of the Al content of the Ti alloy and the total amount of additional elements including Si, on ratios of occurrence of crevice corrosion.

Note that FIGS. 6 and 7 are graphs organizing the influences of the total amount of additional alloying elements on the entire surface corrosion speed and the ratio of occurrence of crevice corrosion, in the case of addition of the single element Al, and in the case of composite addition of the elements Al and Si. As can be seen from these graphs, it has been found that, in the case of the single Al addition, the entire surface corrosion speed and the ratio of occurrence of crevice corrosion are increased approximately linearly, while, when a part of the Al is substituted by Si, the greater the amount of substitution, the more largely the upward trends of the corrosion speed and the ratio of occurrence of corrosion are reduced. Such trends show that the substitution of Si for the part of Al can minimize degradation in the corrosion resistance.

Now, FIG. 8 is a graph organizing the influences of the amounts of Al and Si included in the titanium alloy on the high-temperature oxidation resistance (the thickness reduction resistance, the resistance to formation of the oxygen diffusion zone, the resistance to grain growth) In the graph, a mark ○, a gray mark ○, and a mark ● designated at respective measurement points represent the ratios (X) of reduction in sheet thickness of 1% or less, of not less than 1% and less than 5%, and of 5% or more, respectively, which ratios have been obtained by the aforesaid thickness reduction resistance tests. A numeric value at a part designated by each mark ○ indicates the resistance to formation of the oxygen diffusion zone, i.e. a Vickers hardness of a cross section at a depth of 10 µm below the outmost surface after oxidation processing at 800° C. for 100 hours. A numeric value surrounded by a square indicates the resistance to grain growth, i.e. an average grain size of grains subjected to the same processing, i.e. after oxidation processing at 800° C. for 100 hours. A numeric value surrounded by a round bracket ( ) indicates the embrittlement resistance, i.e. a ratio of reduction (%) in an elongation at an ordinary temperature after the same oxidation processing at 800° C. for 100 hours.

Reference numerals A, B, C, D, CD, CC, and DD illustrated in a miniature located on a right side of the drawing mean the same as those numerals explained in the above-mentioned miniature of FIG. 4.

A comprehensive analysis of the thickness reduction resistance, the resistance to formation of the oxygen diffusion zone, the grain growth resistance, and the embrittlement resistance, which are shown in the graph, enables readout of the following tendency.

In the area DD, the content of each of Al and Si useful for improvement of the high-temperature oxidation resistance is excessive. Any one of the above-mentioned four properties in this area is excellent. In the area CC, the content of each of Al and Si is deficient. Any one of the above-mentioned four properties in this area is inferior, which fails to ensure the satisfactory high-temperature oxidation resistance. In the area C, the content of one of Al and Si is appropriate, while that of the other is deficient. Any one of the above-mentioned four properties in this area is relatively inferior, which fails to ensure the satisfactory high-temperature oxidation resistance. In the area D, the content of one of Al and Si is appropriate, while that of the other is excessive, which results in good high-temperature oxidation resistance. In the area CD, the content of one of Al and Si is deficient, while that of the other is excessive, thereby obtaining the relatively good high-temperature oxidation resistance owing to an effect of the excessive amount of Al or Si.

In contrast, the areas A and B are areas of the examples including the appropriate amounts of Al and Si, do not exhibit as excellent high-temperature oxidation resistance as the area D, but have more excellent high-temperature oxidation resistance properties, as compared to the areas CC and C. The area A among them is a preferable example in which the Si content is not less than one-third of the Al content, and has obviously more excellent high-temperature oxidation resistance than the area B.

A comprehensive analysis of the above-mentioned FIGS. 4 to 8 enables confirmation of the following tendency.

The addition of the appropriate amount of Si to the Ti—Al alloy which contains a relatively reduced Al content which has been already developed by the inventors, preferably addition of the appropriate amount of Si by substitution of the Si for a part of Al, can provide the titanium alloy exhibiting excellent high-temperature oxidation resistance and corrosion resistance even in a strict evaluation test of the high-temperature oxidation resistance. The test has never been performed for the know titanium alloy. Furthermore, minimizing the total content of alloying elements can ensure the same level of workability as the pure titanium alloy, in view of the practical use. Moreover, when performing a comparison in view of the total amount of additional alloying elements, the case of combining Si and Al can minimize the degradation in the corrosion resistance, as compared to the case of addition of the single Al, thereby obtaining a titanium alloy with excellent formability, while having both the high-temperature oxidation resistance and the corrosion resistance.

As will be seen from the examples described below, the addition of an appropriate amount of Nb as another element, or the addition of an appropriate amount of one or more elements selected from the group consisting of Ta, W, Mo, Cr, Zr, and Hf as another element can provide the titanium alloy having the better balance among all of the high-temperature oxidation resistance, the corrosion resistance, and the formability.

EXAMPLE

Now, the configuration, effects and advantages of the invention will be explained hereinafter more specifically by taking examples. It should be understood that the invention should not be limited to the following examples, and that various appropriate modifications can be carried out within a range adaptable to the spirit of the descriptions herein set forth, which modifications are included within the technical scope of the invention.

Example 1

A sample of a titanium alloy ingot having a component composition shown in Table 1 (100 to 200 g) was fabricated using a vacuum button smelting furnace. The titanium alloy ingot was prepared by adding the necessary elements to JIS type 1 pure titanium. The sample was heated to and kept at 1000° C. for two hours, and then was subjected to hot rolling until its thickness was reduced to 6 mm. Then, the sample was heated at 1000° C. for twenty minutes again, subsequently heated to and kept at 840° C. for one hour, and then was subjected to hot rolling at once until its thickness was reduced from 6 mm to 2.5 mm.

The thus-obtained hot rolled sheet was annealed at 800° C. for twenty minutes, and then air cooled. Thereafter, the sheet was subjected to surface grinding to grind its side by 0.5 mm so that an oxidation scale layer formed on a surface might be removed. Then, the sheet was subjected to cold rolling to fabricate a sampling titanium alloy sheet having a thickness of about 1 mm. As a finishing procedure, the sheet was annealed in vacuum at 650° C. for three hours (soaking time).

A tensile test (as mentioned above) and an Erichsen test (as mentioned above) were carried out at ordinary temperature (25° C.) and the tensile test was carried out also at high temperature (600° C., 800° C.), so as to evaluate tensile properties and workability of the thus-obtained sampling sheets. Although a maximum temperature of the tensile test is set to 800° C. in this test, it goes without saying that a temperature at which the titanium alloy of the invention is used is not limited to 800° C. or less.

Further, the thus-obtained sampling sheets had the corrosion resistance evaluated by the general corrosion test and the crevice corrosion test. The high-temperature oxidation resistance of the sheets was also evaluated. In the general corrosion test, a corrosion speed was determined from a change in weight after the sheet was soaked in a boiling 1% $H_2SO_4$ solution for 48 hours. This testing environment is intended to represent a corrosion environment in a muffler.

In the crevice corrosion test, 32 crevices were formed on a sampling piece by a multi-crevice method. After the piece was soaked in a boiling 10% NaCl solution for 240 hours, how many crevices among the 32 crevices were corroded was measured to determine the ratio of occurrence of the crevice corrosion. This testing environment is intended to represent an environment outside an exhaust system. These corrosion tests compare the results under harder conditions than an actually used condition. It does not mean that corrosion occurs at the same level under the actually used condition.

Among the evaluation methods of the high-temperature oxidation resistance, the thickness reduction resistance is evaluated by a rate of reduction in a sheet thickness after oxidation at 800° C. for 100 hours. The resistance to formation of an oxygen diffusion zone is evaluated by measuring a Micro Vickers hardness of a point at a depth of approximately 10 μm below the outmost surface after the oxidation at 800° C. for 100 hours, as mentioned above. The resistance to grain growth is evaluated by measuring a grain size after the oxidation at 800° C. for 100 hours. The embrittlement resistance is evaluated by calculating [an elongation at ordinary temperature after oxidation at 800° C. for 100 hours/an elongation at ordinary temperature in a non-oxidized state]×100(%).

Note that although the testing temperature in evaluation of such oxidation resistance was set to 800° C., this does not mean that a temperature in use of the material of the invention is limited to 800° C. or less. The results are shown in Table 1 and Table 2.

[Table 1]

TABLE 1

| No. | Al | Si | Nb | Other elements | Al/Si Mass ratio Al/Si of not more than 3.0 indicates Si amount of not less than one-third of Al amount. | Total Amount of additional elements mass % | Tensile test | | | | | | Erichsen Test (mm) |
|---|---|---|---|---|---|---|---|---|---|---|---|---|---|
| | | | | | | | Tensile strength (Mpa) | | | Elongation (%) | | | |
| | | mass % | | | | | Room temperature | 600° C. | 800° C. | Room temperature | 600° C. | 800° C. | |
| 1 | 0.50 | 0.10 | 0 | 0 | 5 | 0.6 | 435 | 90 | 30 | 32 | 68 | 145 | 8.8 |
| 2 | 1.0 | 0.20 | 0 | 0 | 5 | 1.2 | 485 | 110 | 48 | 30 | 63 | 140 | 8.6 |
| 3 | 1.0 | 0.30 | 0 | 0 | 3.3 | 1.3 | 494 | 116 | 46 | 28 | 62 | 136 | 8.5 |
| 4 | 1.40 | 0.10 | 0 | 0 | 14 | 1.5 | 502 | 101 | 43 | 30 | 52 | 136 | 8.4 |
| 5 | JIS Class 2 pure Ti | 0 | 0 | 0 | — | 0 | 402 | 45 | 11 | 39 | 142 | 97 | 9 |
| 6 | 0.50 | 0 | 0 | 0 | — | 0.5 | 435 | 66 | 23 | 35 | 71 | 99 | 8.8 |
| 7 | 1.0 | 0 | 0 | 0 | — | 1 | 470 | 82 | 29 | 32 | 65 | 102 | 8.6 |
| 8 | 2.0 | 0 | 0 | 0 | — | 2 | 581 | 98 | 39 | 24 | 53 | 111 | 8 |
| 9 | 0.30 | 0.05 | 0 | 0 | 6 | 0.35 | 410 | 80 | 25 | 34 | 90 | 130 | 8.9 |
| 10 | 33 | 0.20 | 0.90 | 0 | 165 | 34.1 | 880 | 637 | 523 | 2 | 4 | 22 | 2.5 |
| 11 | 5.5 | 0.30 | 1.0 | 0 | 18.3 | 6.8 | 935 | 590 | 510 | 14 | 17 | 30 | 2 |

[Table 2]

TABLE 2

| No. | General corrosion test 1% H$_2$SO$_4$, b.p. 48 hr Corrosion rate (mm/year) | Crevice corrosion test 10% NaCl, b.p. 240 hr Ratio of occurence of crevice corrosion (%) | Thickness reduction resistance 800° C. Rate of reduction in plate thickness after keeping for 100 hours x (%) | Resistance to formation of oxygen diffusion zone 800° C. Micro Vickers hardness of cross section at depth of 10 μm below the outmost surface after keeping for 100 hours | Resistance to grain growth 800° C. Grain size after keeping for 100 hours | Embrittlement resistance Elongation at room temperature after keeping at 800° C. for 100 hours/Elongation at room temperature (%) |
|---|---|---|---|---|---|---|
| 1  | 17.4 | 18.8 | 1< x <5 | 690  | 50   | 87 |
| 2  | 20.6 | 25   | 1< x <5 | 620  | 35   | 92 |
| 3  | 21.8 | 28.1 | 1< x <5 | 600  | 45   | 95 |
| 4  | 24.3 | 31.3 | 1< x <5 | 620  | 50   | 87 |
| 5  | 9.8  | 12.5 | 25      | 1200 | 250  | 65 |
| 6  | 15.4 | 15.6 | 17      | 830  | 200  | 68 |
| 7  | 19   | 25   | 12      | 800  | 140  | 72 |
| 8  | 29.8 | 37.5 | 9       | 790  | 90   | 81 |
| 9  | 13.2 | 15.6 | 9       | 720  | 60   | 80 |
| 10 | 45.2 | 75   | <1      | 480  | <10  | 97 |
| 11 | 40.6 | 62.5 | <1      | 520  | <10  | 93 |

The analysis of the titanium alloys can be conducted based on Tables 1 and 2 as follows.

Samples No. 1 to 4 are the titanium alloys of the invention which include appropriate amounts of Al and Si. For example, these alloys of the invention have high elongation and Erichsen value, and excellent workability, as compared to the conventional type of titanium alloy with the heat and oxidation resistance which includes a relatively high content of Al such as that shown in No. 10, and 11. Furthermore, these samples have approximately the same level of corrosion resistance as the pure titanium. The samples each have a smaller rate of reduction in sheet thickness, which is a barometer of the thickness reduction resistance, as compared to the pure titanium, and has a lower hardness of a cross section in vicinity of the outmost surface, which hardness is a barometer of the resistance to formation of the oxygen diffusion zone. These samples have smaller growth of grains after keeping at 800° C. for 100 hours, and a much higher value of [an elongation at ordinary temperature after keeping at 800° C. for 100 hours/an elongation at ordinary temperature], which is a barometer of the embrittlement resistance, than those of the pure titanium. It is found that the samples have the excellent embrittlement resistance.

In contrast, samples No. 6 to 8, to which the single Al is added without Si, have insufficient high-temperature strength, and are inferior to the titanium alloy of the samples No. 1 to 4 in the high-temperature oxidation resistance (the thickness reduction resistance, the resistance to formation of the oxygen diffusion zone, the resistance to the grain growth, and the embrittlement resistance). The sample No. 9 includes Si together with Al, but the amount of Si is small. Thus, the sample No. 9 is inferior in the high-temperature oxidation resistance (the thickness reduction resistance, the resistance to formation of the oxygen diffusion zone, the resistance to grain growth, and the embrittlement resistance), as compared to the titanium alloys No. 1 to 4.

Each of the samples No. 10 and 11 is a conventional type of Ti—Al based alloy which includes a relatively great amount of additional alloying elements including Al. The sample has good high-temperature oxidation resistance because of a great amount of additional alloying elements, but has poor elongation rate and low Erichsen value, which results in poor formability and bad corrosion resistance.

Example 2

As is the case with the example 1, a sample of a titanium alloy ingot having a component composition shown in Table 3 was fabricated. Thereafter, the sample was subjected to hot rolling, annealing, air cooling, surface grinding for removing an oxidation scale layer, and cold rolling in the same order and manner as the example 1, to fabricate a sampling titanium sheet having a thickness of about 1 mm. As a finishing procedure, the sheet was annealed in vacuum at 650° C. for three hours (soaking period).

The thus-obtained sampling sheets were subjected to the tensile test, the Erichsen test, the corrosion resistance test, and the high-temperature oxidation resistance test in the same manner as the example 1, which results were shown in Tables 3 and 4.

[Table 3]

TABLE 3

| No. | Al mass % | Si mass % | Nb | Other elements | Ai/Si Mass ratio Al/Si of not more than 3.0 indicates Si amount of not less than one-third of Al amount. | Total Amount of additional elements mass % | Tensile strength (Mpa) Room temperature | 600° C. | 800° C. | Elongation (%) Room temperature | 600° C. | 800° C. | Erichsen Test (mm) |
|---|---|---|---|---|---|---|---|---|---|---|---|---|---|
| 1 | 0.30 | 0.10 | 0 | 0 | 3   | 0.40 | 412 | 86  | 29 | 33 | 80 | 142 | 8.8 |
| 2 | 0.30 | 1.0  | 0 | 0 | 0.3 | 1.30 | 460 | 129 | 48 | 27 | 55 | 120 | 8.4 |

TABLE 3-continued

| No. | Al | Si mass % | Nb | Other elements | Al/Si Mass ratio Al/Si of not more than 3.0 indicates Si amount of not less than one-third of Al amount. | Total Amount of additional elements mass % | Tensile strength (Mpa) Room temperature | 600° C. | 800° C. | Elongation (%) Room temperature | 600° C. | 800° C. | Erichsen Test (mm) |
|---|---|---|---|---|---|---|---|---|---|---|---|---|---|
| 3 | 0.50 | 0.30 | 0 | 0 | 1.67 | 0.80 | 469 | 102 | 39 | 29 | 61 | 99 | 8.7 |
| 4 | 0.50 | 0.60 | 0 | 0 | 0.83 | 1.10 | 498 | 120 | 38 | 26 | 58 | 122 | 8.5 |
| 5 | 0.50 | 0.80 | 0 | 0 | 0.63 | 1.30 | 509 | 128 | 43 | 26 | 57 | 131 | 8.4 |
| 6 | 0.50 | 1.0 | 0 | 0 | 0.5 | 1.50 | 530 | 134 | 49 | 26 | 53 | 136 | 8.5 |
| 7 | 1.0 | 0.60 | 0 | 0 | 1.67 | 1.60 | 522 | 125 | 43 | 26 | 53 | 152 | 8.3 |
| 8 | 1.0 | 0.80 | 0 | 0 | 1.25 | 1.80 | 532 | 135 | 49 | 25 | 52 | 160 | 8.1 |
| 9 | 1.4 | 1.0 | 0 | 0 | 1.4 | 2.4 | 563 | 149 | 70 | 25 | 43 | 168 | 7.8 |
| 10 | 0.30 | 0.05 | 0 | 0 | 6 | 0.35 | 410 | 110 | 43 | 34 | 59 | 129 | 8.9 |
| 11 | 0.50 | 0.10 | 0 | 0 | 5 | 0.60 | 435 | 90 | 30 | 32 | 68 | 145 | 8.8 |
| 12 | 1.0 | 0.20 | 0 | 0 | 5 | 1.20 | 485 | 110 | 48 | 30 | 63 | 140 | 8.6 |
| 13 | 1.0 | 0.30 | 0 | 0 | 3.3 | 1.30 | 494 | 116 | 46 | 28 | 62 | 136 | 8.5 |
| 14 | 1.4 | 0.10 | 0 | 0 | 14 | 1.50 | 502 | 101 | 43 | 30 | 52 | 136 | 8.4 |
| 15 | JIS Class 2 pure Ti | 0 | 0 | 0 | — | 0 | 402 | 60 | 17 | 39 | 142 | 97 | 9 |
| 16 | 0.50 | 0 | 0 | 0 | — | 0.50 | 435 | 66 | 23 | 35 | 71 | 99 | 8.8 |
| 17 | 1.0 | 0 | 0 | 0 | — | 1.0 | 470 | 82 | 29 | 32 | 65 | 102 | 8.6 |
| 18 | 2.0 | 0 | 0 | 0 | — | 2.0 | 581 | 98 | 39 | 24 | 53 | 111 | 8 |
| 19 | 33 | 0.20 | 0.9 | 0 | 165 | 34.1 | 880 | 637 | 523 | 2 | 4 | 22 | 2.5 |
| 20 | 5.5 | 0.30 | 1.0 | 0 | 18.3 | 6.8 | 935 | 590 | 510 | 14 | 17 | 30 | 2 |

[Table 4]

TABLE 4

| No. | General corrosion test 1% $H_2SO_4$, b.p. 48 hr corrosion rate (mm/year) | Crevice corrosion test 10% NaCl, b.p. 240 hr Ratio of occurence of crevice corrosion (%) | Thickness reduction resistance 800° C. Rate of reduction in plate thickness after keeping for 100 hours x (%) | Resistance to formation of oxygen diffusion zone 800° C. Micro Vickers hardness of cross section at depth of 10 μm below the outmost surface after keeping for 100 hours | Resistance to grain growth 800° C. Grain size after keeping for 100 hours | Embrittlement resistance Elongation at room temperature after keeping at 800° C. for 100 hours/Elongation at room temperature (%) |
|---|---|---|---|---|---|---|
| 1 | 14.3 | 15.6 | 1< x <5 | 695 | 35 | 85 |
| 2 | 14.8 | 18.8 | x <1 | 565 | <10 | 95 |
| 3 | 17.5 | 15.6 | 1< x <5 | 590 | <10 | 90 |
| 4 | 17.8 | 15.6 | x <1 | 580 | <10 | 92 |
| 5 | 18.2 | 15.6 | x <1 | 570 | <10 | 96 |
| 6 | 18.5 | 28.8 | x <1 | 550 | <10 | 97 |
| 7 | 22.2 | 28.1 | x <1 | 575 | <10 | 94 |
| 8 | 22.1 | 28.1 | x <1 | 543 | <10 | 95 |
| 9 | 27.9 | 34.4 | x <1 | 464 | <10 | 99 |
| 10 | 13.2 | 15.6 | 1< x <5 | 720 | 60 | 80 |
| 11 | 17.4 | 18.8 | 1< x <5 | 690 | 50 | 87 |
| 12 | 20.6 | 25 | 1< x <5 | 620 | 35 | 92 |
| 13 | 21.8 | 28.1 | 1< x <5 | 600 | 45 | 95 |
| 14 | 24.3 | 31.3 | 1< x <5 | 620 | 50 | 87 |
| 15 | 9.8 | 12.5 | 25 | 1200 | 250 | 65 |
| 16 | 15.4 | 15.6 | 17 | 830 | 200 | 68 |
| 17 | 19.4 | 25 | 12 | 800 | 140 | 72 |
| 18 | 29.8 | 37.5 | 9 | 790 | 90 | 81 |
| 19 | 45.2 | 75 | x <1 | 480 | <10 | 97 |
| 20 | 40.6 | 62.5 | x <1 | 520 | <10 | 93 |

In Table 3 and Table 4, the samples No. 1 to 14 (except for No. 10) are examples that meet the definition of the invention, and have the better balance among all of the formability, the corrosion resistance, and the high-temperature oxidation resistance. On the other hand, the sample No. 10 is a comparative material which includes a minimum content of Al and an insufficient content of Si, and has good formability and corrosion resistance, but has bad resistance to formation of oxygen diffusion zone and bad resistance to grain growth among the high-temperature oxidation resistance. Note that the pure titanium material No. 15 and the titanium alloy materials No. 16 to 20 correspond to the samples No. 5 to 11 shown in Table 1 and Table 2 of the example 1. Any one of these materials defeats the object of the invention in a comprehensive manner.

Example 3

As is the case with the example 1, a sample of a titanium alloy ingot having a component composition shown in Table 5 was fabricated. Thereafter, the sample was subjected to hot rolling, annealing, air cooling, surface grinding for removing an oxidation scale layer, and cold rolling in the same order and manner as the example 1, to fabricate a sampling titanium sheet having a thickness of about 1 mm. As a finishing procedure, the sheet was annealed in vacuum at 650° C. for three hours (soaking period).

The thus-obtained sampling sheets each were subjected to the tensile test, the Erichsen test, the corrosion resistance test, and the high-temperature oxidation resistance test in the same manner as the example 1, which results were shown in Tables 5 and 6.

[Table 5]

TABLE 5

| No. | Al | Si | Nb | Other elements | Ai/Si Mass ratio Al/Si of not more than 3.0 indicates Si amount of not less than one-third of Al amount. | Total Amount of additional elements mass % | Tensile test | | | | | | Erichsen test (mm) |
|---|---|---|---|---|---|---|---|---|---|---|---|---|---|
| | | | | | | | Tensile strength (Mpa) | | | Elongation (%) | | | |
| | | | | mass % | | | Room temperature | 600° C. | 800° C. | Room temperature | 600° C. | 800° C. | |
| 1 | 0.5 | 0.6 | 0 | 0 | 0.83 | 1.1 | 498 | 120 | 38 | 26 | 58 | 122 | 8.5 |
| 2 | 0.5 | 0.6 | 0.05 | 0 | 0.83 | 1.15 | 498 | 132 | 50 | 26 | 57 | 120 | 8.5 |
| 3 | 0.5 | 0.6 | 0.2 | 0 | 0.83 | 1.3 | 502 | 130 | 47 | 23 | 54 | 117 | 8.3 |
| 4 | 0.5 | 0.6 | 0.5 | 0 | 0.83 | 1.6 | 508 | 135 | 44 | 22 | 50 | 111 | 8.2 |
| 5 | 0.5 | 0.3 | 0 | 0 | 1.67 | 0.8 | 469 | 102 | 39 | 29 | 61 | 99 | 8.7 |
| 6 | 0.5 | 0.3 | 0.05 | 0 | 1.67 | 0.85 | 470 | 108 | 42 | 29 | 60 | 93 | 8.7 |
| 7 | 0.5 | 0.3 | 0.2 | 0 | 1.67 | 1 | 475 | 108 | 42 | 27 | 59 | 90 | 8.6 |
| 8 | 0.5 | 0.3 | 0.5 | 0 | 1.67 | 1.3 | 479 | 110 | 49 | 26 | 57 | 86 | 8.4 |
| 9 | 1 | 0.6 | 0 | 0 | 1.67 | 1.6 | 522 | 125 | 43 | 26 | 53 | 152 | 8.3 |
| 10 | 1 | 0.6 | 0.05 | 0 | 1.67 | 1.65 | 523 | 128 | 45 | 26 | 50 | 145 | 8.3 |
| 11 | 1 | 0.6 | 0.2 | 0 | 1.67 | 1.8 | 527 | 130 | 48 | 25 | 50 | 144 | 8.1 |
| 12 | 1 | 0.6 | 0.5 | 0 | 1.67 | 2.1 | 533 | 135 | 52 | 22 | 46 | 139 | 8 |
| 13 | 1 | 0.3 | 0 | 0 | 3.33 | 1.3 | 494 | 116 | 46 | 28 | 62 | 136 | 8.5 |
| 14 | 1 | 0.3 | 0.05 | 0 | 3.33 | 1.35 | 495 | 117 | 47 | 28 | 61 | 130 | 8.5 |
| 15 | 1 | 0.3 | 0.2 | 0 | 3.33 | 1.5 | 498 | 120 | 49 | 27 | 58 | 129 | 8.3 |
| 16 | 1 | 0.3 | 0.5 | 0 | 3.33 | 1.8 | 500 | 124 | 50 | 25 | 54 | 125 | 8.3 |

[Table 6]

TABLE 6

| No. | General corrosion test 1% $H_2SO_4$, b.p. 48 hr corrosion rate (mm/year) | Crevice corrosion test 10% NaCl, b.p. 240 hr Ratio of occurence of crevice corrosion (%) | Thickness reduction resistance 800° C. Rate of reduction in plate thickness after keeping for 100 hours x (%) | Resistance to formation of oxygen diffusion zone 800° C. Micro Vickers hardness of cross section at depth of 10 μm below the outmost surface after keeping for 100 hours | Resistance to grain growth 800° C. Grain size after keeping for 100 hours | Embrittlement resistance Elongation at room temperature after keeping at 800° C. for 100 hours/Elongation at room temperature (%) |
|---|---|---|---|---|---|---|
| 1 | 17.8 | 15.6 | x <1 | 580 | <10 | 92 |
| 2 | 18 | 15.6 | x <1 | 570 | <10 | 96 |
| 3 | 18.2 | 15.6 | x <1 | 532 | <10 | 98 |
| 4 | 18.5 | 18.8 | x <1 | 474 | <10 | 98 |
| 5 | 17.5 | 15.6 | 1< x <5 | 590 | <10 | 90 |
| 6 | 17.5 | 15.6 | x <1 | 575 | <10 | 94 |
| 7 | 17.5 | 15.6 | x <1 | 543 | <10 | 95 |
| 8 | 17.9 | 15.6 | x <1 | 480 | <10 | 96 |
| 9 | 22.2 | 28.1 | x <1 | 575 | <10 | 94 |

TABLE 6-continued

| No. | General corrosion test 1% H₂SO₄, b.p. 48 hr corrosion rate (mm/year) | Crevice corrosion test 10% NaCl, b.p. 240 hr Ratio of occurence of crevice corrosion (%) | Thickness reduction resistance 800° C. Rate of reduction in plate thickness after keeping for 100 hours x (%) | Resistance to formation of oxygen diffusion zone 800° C. Micro Vickers hardness of cross section at depth of 10 μm below the outmost surface after keeping for 100 hours | Resistance to grain growth 800° C. Grain size after keeping for 100 hours | Embrittlement resistance Elongation at room temperature after keeping at 800° C. for 100 hours/Elongation at room temperature (%) |
|---|---|---|---|---|---|---|
| 10 | 22.8 | 28.1 | x <1 | 560 | <10 | 97 |
| 11 | 23.1 | 28.1 | x <1 | 524 | <10 | 98 |
| 12 | 23.7 | 31.3 | x <1 | 460 | <10 | 99 |
| 13 | 21.8 | 28.1 | 1< x <5 | 600 | 45 | 95 |
| 14 | 22.3 | 28.1 | x <1 | 572 | 20 | 97 |
| 15 | 22.9 | 28.1 | x <1 | 520 | <10 | 97 |
| 16 | 23.4 | 28.1 | x <1 | 490 | <10 | 98 |

These titanium alloys were fabricated so as to confirm an effect produced by addition of Nb as well as Al and Si. The addition of Nb is not found to produce as outstanding effects as the addition of Al or Si, but can be found to enhance the high-temperature oxidation resistance and in particular the resistance to formation of the oxygen diffusion zone without adversely affecting the formability so much.

Example 4

As is the case with the example 1, a sample of a titanium alloy ingot having a component composition shown in Table 7 was manufactured. Thereafter, the sample was subjected to hot rolling, annealing, air cooling, surface grinding for removing an oxidation scale layer, and cold rolling in the same order as the example 1, to manufacture a pure titanium sheet having a thickness of about 1 mm. As a finishing procedure, the sheet was annealed in vacuum at 650° C. for three hours (soaking period).

The thus-obtained sampling sheets were subjected to the tensile test, the Erichsen test, the corrosion resistance test, and the high-temperature oxidation resistance test in the same manner as the example 1, which results were shown in Tables 7 and 8.

[Table 7]

TABLE 7

| No. | Al mass % | Si mass % | Nb mass % | Other elements | Al/Si Mass ratio Al/Si of not more than 3.0 indicates Si amount of not less than one-third of Al amount. | Total Amount of additional elements mass % | Tensile test Tensile strength (Mpa) Room temperature | 600° C. | 800° C. | Elongation (%) Room temperature | 600° C. | 800° C. | Erichsen test (mm) |
|---|---|---|---|---|---|---|---|---|---|---|---|---|---|
| 1 | 0.5 | 0.3 | 0.2 | 0 | 1.67 | 1 | 475 | 108 | 42 | 27 | 59 | 90 | 8.6 |
| 2 | 0.5 | 0.3 | 0.2 | Ta 0.2 | 1.67 | 1.2 | 485 | 111 | 49 | 25 | 50 | 78 | 8.4 |
| 3 | | | | W 0.2 | | | 480 | 115 | 50 | 23 | 52 | 76 | 8.3 |
| 4 | | | | Mo 0.2 | | | 486 | 109 | 52 | 22 | 53 | 78 | 8.4 |
| 5 | | | | Cr 0.2 | | | 489 | 119 | 51 | 23 | 53 | 75 | 8.2 |
| 6 | | | | Zr 0.2 | | | 478 | 108 | 47 | 25 | 57 | 84 | 8.2 |
| 7 | | | | Hf 0.2 | | | 479 | 113 | 48 | 25 | 57 | 83 | 8.3 |
| 8 | 0.5 | 0.3 | 0.2 | Ta etc. 0.6 | 1.67 | 1.6 | 528 | 119 | 57 | 22 | 48 | 71 | 8 |

*1: Add each of Ta, W, Mo, Cr, Zr, and Hf in amount of 0.1% by mass, the total amount of which is 0.6% by mass.

[Table 8]

TABLE 8

| No. | General corrosion test 1% H$_2$SO$_4$, b.p. 48 hr corrosion rate (mm/year) | Crevice corrosion test 10% NaCl, b.p. 240 hr Ratio of occurence of crevice corrosion (%) | Thickness reduction resistance 800° C. Rate of reduction in plate thickness after keeping for 100 hours x (%) | Resistance to formation of oxygen diffusion zone 800° C. Micro Vickers hardness of cross section at depth of 10 μm below the outmost surface after keeping for 100 hours | Resistance to grain growth 800° C. Grain size after keeping for 100 hours | Embrittlement resistance Elongation at room temperature after keeping at 800° C. for 100 hours/Elongation at room temperature (%) |
|---|---|---|---|---|---|---|
| 1 | 17.5 | 15.6 | x <1 | 543 | <10 | 95 |
| 2 | 17.1 | 15.6 | x <1 | 534 | <10 | 98 |
| 3 | 16.9 | 15.6 | x <1 | 534 | <10 | 98 |
| 4 | 17.2 | 15.6 | x <1 | 536 | <10 | 97 |
| 5 | 17   | 15.6 | x <1 | 533 | <10 | 97 |
| 6 | 17.4 | 15.6 | x <1 | 528 | <10 | 99 |
| 7 | 17.3 | 15.6 | x <1 | 529 | <10 | 99 |
| 8 | 18.6 | 18.8 | x <1 | 525 | <10 | 99 |

These titanium alloys were fabricated so as to confirm an effect produced by addition of Ta, W, Mo, Cr, Zr, and/or Hf as well as Al, Si, and Nb. It has been recognized that any element has a tendency to slightly enhance the tensile strength, while decreasing the elongation, which tendency is extremely small, but has effects of enhancing the resistance to formation of the oxygen diffusion zone and the embrittlement resistance among the high-temperature oxidation resistance properties.

Example 5

The Ti—Al—Si alloy sheet made of the alloy No. 4 in Table 3 shown in the example 2, was subjected to hot-dip Al plating procedure having the following condition, and then a film of a thickness of about 2 μm with oxidation resistance was formed on the sheet. Subsequently, the thus-obtained sheet was subjected to the tensile test, the Erichsen test, and the high-temperature oxidation resistance test in the same manner as the example 1, which results were shown in Tables 9 and 10.

The hot-dip Al plating procedure: Each sampling titanium alloy sheet was soaked in molten Al (Al content: 97% or more) heated and melted at 700° C. for 10 minutes and removed therefrom to form an Al plating layer having an average thickness of about 2 μm.

[Table 9]

TABLE 9

| No. | Al | Si | Nb | Other elements mass % | Ai/Si Mass ratio Al/Si of not more than 3.0 indicates Si amount of not less than one-third of Al amount. | Total amount of additional elements mass % | Surface treatment | Tensile strength (Mpa) Room temperature | 600° C. | 800° C. | Elongation (%) Room temperature | 600° C. | 800° C. | Erichsen Test (mm) |
|---|---|---|---|---|---|---|---|---|---|---|---|---|---|---|
| 1 | 0.5 | 0.6 | 0 | 0 | 0.83 | 1.1 | None | 498 | 120 | 38 | 26 | 58 | 122 | 8.5 |
| 2 | 0.5 | 0.6 | 0 | 0 | 0.83 | 1.1 | Hot-dip Al plating (Thickness 2 μm) | 501 | 122 | 42 | 25 | 59 | 124 | 8.6 |

[Table 10]

TABLE 10

| No. | Thickness reduction resistance 800° C. Rate x of reduction in plate thickness after keeping for 100 hours (%) | Resistance to formation of oxygen diffusion zone 800° C. Micro Vickers hardness of cross section at depth of 10 μm below the outmost surface after keeping for 100 hours | Resistance to grain growth 800° C. Grain size after keeping for 100 hours | Embrittlement resistance Elongation at room temperature after keeping at 800° C. for 100 hours/Elongation at room temperature (%) |
|---|---|---|---|---|
| 1 | x < 1 | 580 | <10 | 92 |
| 2 | x < 1 | 172 | <10 | 99 |

As can be shown in Table 9 and Table 10, the formation of the hot-dip Al plating film on the surface of the Ti—Al—Si alloy sheet that meets the definition of the invention effectively improves the high-temperature oxidation resistance, in particular, the resistance to formation of the oxygen diffusion zone and the embrittlement resistance without adversely affecting the tensile property, i.e. the formability so much.

[Making Procedure into Exhaust System]

A Ti-0.5% Al-0.6% Si alloy was melted using a consumable electrode type arc smelting furnace to fabricate one-ton ingot. This ingot was subjected to procedures, e.g. forging, hot rolling, annealing, removing of a scale layer, cold rolling, and annealing in vacuum in the normal manner to manufacture a coil having a sheet thickness of 0.75 mm. In this experiment, the Ti-0.5% Al-0.6% Si alloy was able to be processed into a thin sheet by adopting manufacturing processes of the JIS class 2 pure titanium substantially as they are.

The thus-obtained coil was used to manufacture welded tubes having respective external diameters of 50.8 mm and 60.5 mm. A titanium sheet cut from the coil was welded to the obtained tube, which was used as an exhaust pipe or as part of an external cylinder of a silencer pipe and of an interior packaging thereof to manufacture a motorbike exhaust system. This case did not pose any problems in assembly of the exhaust system. Further, this exhaust system did not cause any troubles of the corrosion resistance and the high-temperature oxidation resistance even in an actually used vehicle evaluation test. The evaluation test is adapted to vehicles which are found to cause cracks due to high-temperature oxidation in an existing titanium alloy exhaust system because the exhaust pipe is heated to a high temperature.

What is claimed is:

1. An exhaust system made of a titanium alloy comprising, by mass, Al: 0.30–1.50%, and Si: 0.10–1.0%, wherein amass ratio Si/Al is not less than 1/3.

2. The exhaust system according to claim 1, wherein the mass ratio Si/Al is not more than 1.5.

3. The exhaust system according to claim 1, further comprising Nb: 0.1–0.5% by mass.

4. The exhaust system according to claim 1, further comprising at least one additional element selected from the group consisting of Ta, W, Mo, Cr, Zr and Hf, wherein a total amount of the Al, the Si and the at least one additional element is not more than 2.5% by mass.

5. The exhaust system according to claim 1, wherein the alloy has a surface thereof subjected to aluminum-based plating.

6. The exhaust system according to claim 5, wherein a thickness of the aluminum-based plating is 1 μm or more.

7. The exhaust system according to claim 1, wherein the exhaust system is a muffler.

* * * * *

UNITED STATES PATENT AND TRADEMARK OFFICE
CERTIFICATE OF CORRECTION

PATENT NO. : 7,166,367 B2 Page 1 of 1
APPLICATION NO. : 11/067763
DATED : January 23, 2007
INVENTOR(S) : Yashiki et al.

It is certified that error appears in the above-identified patent and that said Letters Patent is hereby corrected as shown below:

On the title page, Item (73), the Assignee Information is incorrect. Item (73) should read:

-- (73) Assignee: **Kabushiki Kaisha Kobe Seiko Sho
(Kobe Steel, Ltd.**) Kobe (JP)--

Signed and Sealed this

Twenty-seventh Day of March, 2007

JON W. DUDAS
*Director of the United States Patent and Trademark Office*